Patented Feb. 25, 1947

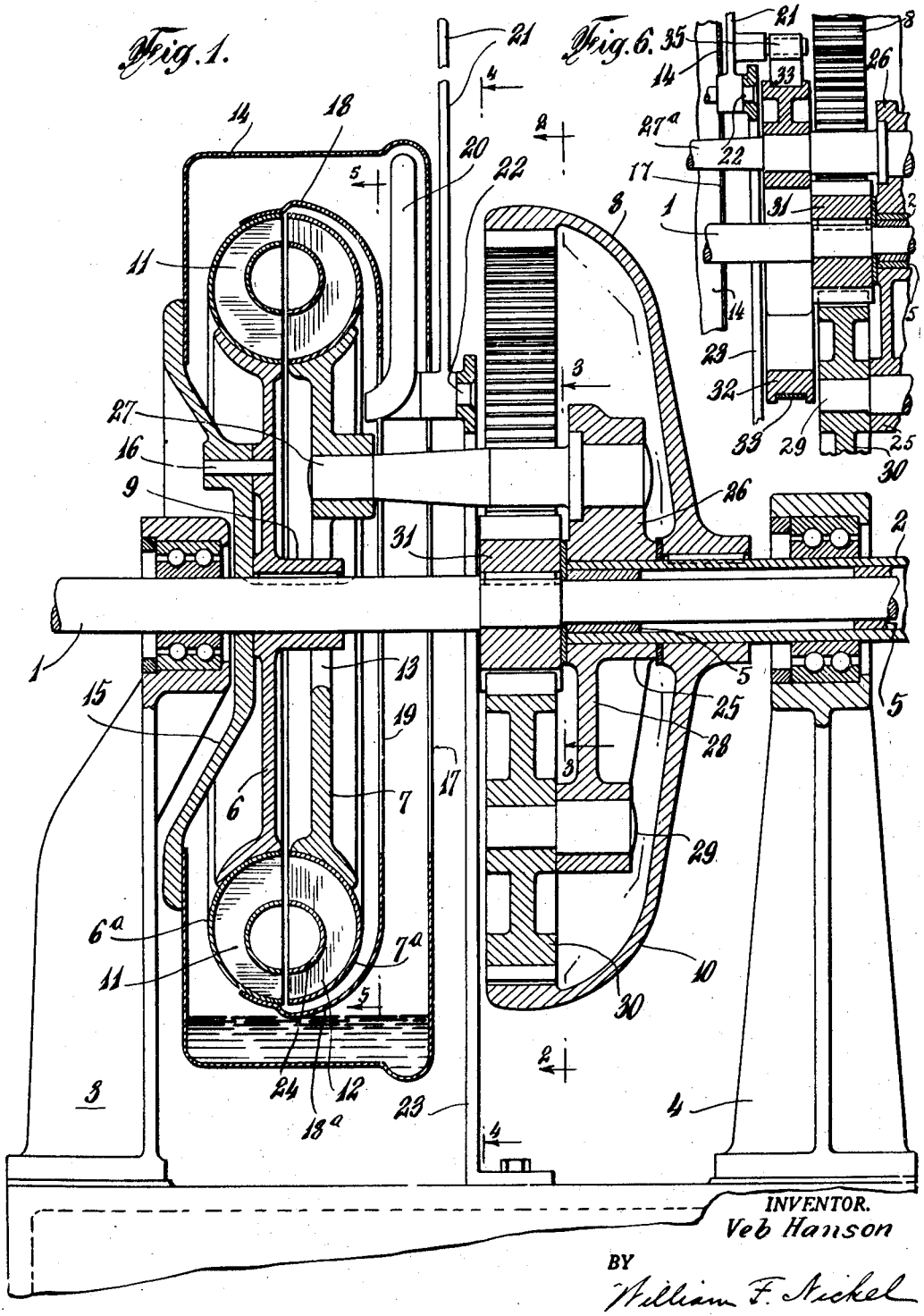

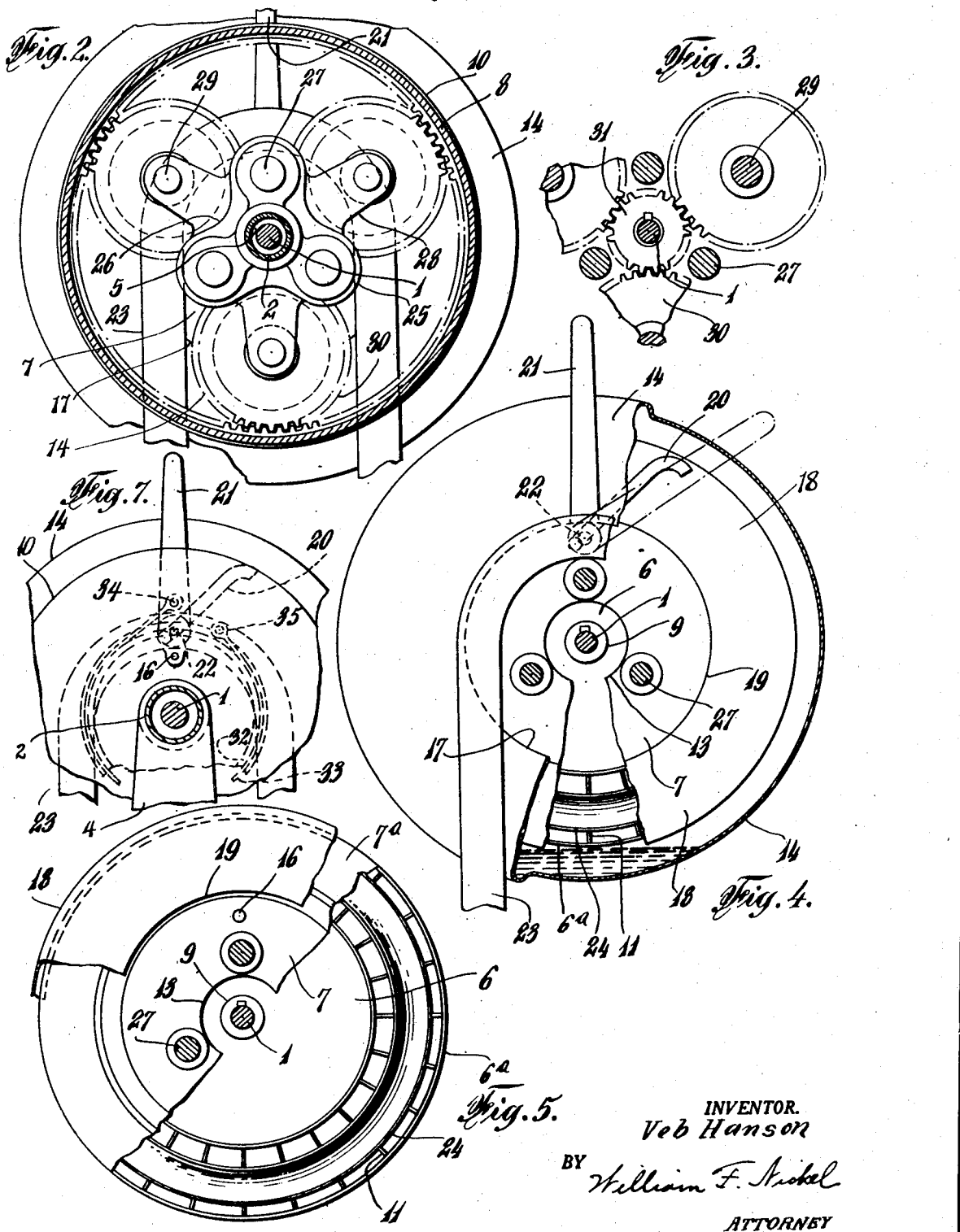

2,416,311

UNITED STATES PATENT OFFICE 2,416,311

TRANSMISSION MECHANISM

Veb Hanson, Troy, N. Y.

Application July 6, 1943, Serial No. 493,664

6 Claims. (Cl. 74—189.5)

This invention relates to improvements in transmission mechanism; and particularly to apparatus for converting the speed of a driving member into motion at any selected rate over a predetermined range of actuation; or to produce reverse motion at the operator's will.

An object of the invention is to provide apparatus for imparting motion through the kinetic energy of a fluid from one member to another; in combination with additional elements which automatically react to changes in the effects of said fluid to cause a driven member to run at the speed desired; and which can be easily adjusted to bring about motion in the opposite direction.

In its preferred form the invention comprises a rotary member having fixed vanes thereon, and designed to impel a fluid against similar vanes carried by another member to be rotated. The vane-carrying members act through gearing of the planetary type, so related to said members that the resultant speed varies directly as the quantity of fluid employed. Hence the final speed can be varied in almost any value or degree over the range given. The construction further includes an attachment for modifying the action of the planetary gearing so that reverse motion can at any time be readily obtained.

Another object is to provide a transmission apparatus which can be regulated in a very simple and certain fashion to give all the effects above noted through the manipulation of a single controlling lever.

A further object of the invention is to provide a device by which the speed of a shaft or other driven member can be adjusted in the manner above set forth, and yet always operate smoothly and in a very efficient manner.

These and other objects and advantages will become apparent in the ensuing description, taken in connection with the accompanying drawings; on which a preferred embodiment of the invention is illustrated. But while specific construction is disclosed, I do not wish to be limited to details herein set forth; reserving to myself the right to make changes in the shape, size and arrangement of parts that fall within the scope of the invention and the general meanings of the terms in which the appended claims are expressed:

On said drawings:

Figure 1 is a longitudinal sectional view through transmission mechanism in accordance with this invention.

Figure 2 is a cross sectional view taken on the line 2—2 of Figure 1.

Figure 3 is a cross sectional view of 3—3 of Figure 1; showing the gearing only;

Figure 4 is a cross sectional view on the line 4—4 of Figure 1.

Figure 5 is a cross sectional view on the line 5—5 of Figure 1; inside the apparatus;

Figure 6 is a section showing the attachment for reversing the apparatus.

Figure 7 shows how the reversing attachment is operated.

The same numerals identify the same parts throughout.

As presented in the drawings, the mechanism comprises a drive shaft 1, the end of which is enveloped by a tubular driven shaft 2. The shaft 1 may be rotated by a constant speed motor, or other power unit, and the shaft 2 is to be connected to any apparatus, the speed of which is to be varied. The invention is adapted to reduce the rotation of the shaft 2 to any desired value, from that of the shaft 1 down to zero.

The end of the shaft 1 is shown mounted in a bearing at the top of a support 3, on a frame or base; and the shaft 2 in a similar bearing at the top of a support 4. The end of the drive shaft is reduced somewhat over a portion at one end, which is enveloped by the shaft 2; and this shaft contains bushings 5 which surround the reduced portion of the drive shaft. Fixed on the shaft 1, adjacent to support 3, is a driving or impeller member, or rotor 6, which transmits power to a similar impelled member 7, that rotates the shaft 2 through gearing embracing an outer internal gear 8, upon the driven shaft. The rotor 6 is secured to the shaft 1 by means of a hub 9 keyed to the shaft; and the internal gear 8 is part of a housing 10 keyed to the shaft 2, near to the support 4.

To the rotor 6 is affixed the half 6a of a torus ring provided with vanes 11 in it around its extent to impel a hydraulic transmission medium, which is preferably light oil, against similar vanes 12, in the complementary half 7a of the torus ring, secured to the circumference of the driven member 7. The latter surrounds the hub 9 of the member 6 and has a central opening 13 into which the hub projects, so that the member or vane-carrying means 7 can turn freely. The rotor 6 and the driven member 7 are enveloped at their circumferences by an outer oil casing 14, which is affixed to a dish shaped plate 15, surrounding the shaft 1 between the support 3 and the hub 9 and made fast to the rotor 6 by pins or rivets 16. The opposite side or end of this casing has an enlarged opening 17 facing the internal gear housing 10. Within this oil container or casing and affixed to the outer, or peripheral, edge of the part 6a is an oil guard ring 18 which envelops the driven member 7 and the vanes 12 thereon; and has a large central opening 19 in line with the opening 17 of the oil casing 14. This casing contains the oil which is impelled by the rotor part 6 to turn the part or member 7 and this oil is directed into the oil guard ring 18 from the circumferential zone within the casing 14 through a spout or scoop tube 20. This tube is open at both ends and it is adjusted by means of a lever or handle 21. The scoop tube and lever arm are rigid with each other and both are mounted to rotate on a pin 22 in a fixed support or bracket 23, fixed to the base or bed of the apparatus. The outer end of the tube or spout 20 is presented to the oil in the casing 14 against the direction of rotation; and its inner end delivers through the opening 19 into the oil guard ring 18.

In practice, as the shaft 1 and rotor revolve, the oil in the casing 14 collects against the inside surface of the casing 14 all around the circumference thereof under the action of centrifugal force. By means of the handle or lever 21 the spout 20 can be put into position to scoop up more or less oil from the circumferential zone within the casing 14 and deliver it to the oil ring 18 in which it flows between the two sets of vanes 11 and 12 and causes motion to be imparted to the member 7.

The vanes 11 and 12 are flat and substantially semi-circular and have curved recesses in their opposed straight edges. Hence each set can receive the half of a torus guide ring 24 which is set into these vanes so as to be nearer to their outer radial ends than their inner ends. The two halves of the ring match each other; and the presence of vanes provides radially extending curved passages which are somewhat smaller in depth, but greater in width at points which are farthest from the axis of rotation. Thus the passages or spaces between the vanes can be designed to have the same cross-sectional area throughout.

The gearing between the member 7 and the shaft 2 comprises not only the internal outer gear 8, but also a supporting element or member 25 in the housing 10, mounted free on the inner end of the shaft 2. This member 25 has arms 26 attached by studs 27 to the member 7 at points eccentric to the axis of rotation, so that these two members will rotate as a unit. The member 25 bears arms 28 with journals 29 on which are mounted planetary gears 30 to mesh with the outer gear 8. The gears 30 are engaged by a central pinion 31 keyed on the shaft 1. Through these gears the part 10 and shaft 2 are turned.

The fluid coupling apparatus comprising the impeller and driven members with their vanes, will have one or more openings 18a in the oil ring 18 through which the fluid medium can leak out back into the oil casing 14 when the tube or spout 20 is moved to off position. The leakage will be at a very slow rate and the oil used is, of course, very thin.

While the apparatus is at rest the oil will, of course, collect at the lowest point of the casing 14 as shown in Figure 1. As soon as the rotor 6 turns, carrying the oil casing around with it, the oil will form a shell or zone inside the casing 14. When the spout or nozzle is in the position shown in Figure 4, no oil will be picked up by it, to be directed into the oil ring 18. When, however, this spout is swung to the left with reference to Figure 4, the curved end thereof will enter the zone of the oil and revolution of the member 7 will result.

When the arm 21 is shifted so that the oil will fill it to its full capacity, the driven shaft will turn at the same rate as the shaft 1; because the gears 30 then revolve only with the members 7 and 25 and do not rotate on their journals 29. They thus carry the gear 8 with them and are really fixed with regard to the gear 8. With the rings 6a—7a empty, the shaft 2 will be motionless. Intermediate positions of the arm 21 and spout 20 will give any desired speed to the driven shaft 2, between maximum speed of the drive shaft and zero. This is because when the member 7 runs slower than the member 6, the pinion 31 rotates the gears 30 and gear 8 is in effect retarded. Thus the speed of shaft 2 depends upon the amount of oil fed through ring 18 to the vanes 11 and 12. The total efficiency of the apparatus will be quite high; that of the mechanical gearing being at least 90% and that of the hydraulic members in full coupling about 95%. The reduction in speed will always be smoothly made and quiet operation of the shaft 2 will always be assured. There is no liability that the shaft will break. There is no liability that the gear teeth will break.

In the construction of Figure 6, the gear 8 is set back far enough from the bracket 23 to permit a brake drum or ring 32 to be mounted between said parts. This brake ring is grooved in its outer face to receive a brake band 33, fixed at its end to a stud 34 on the arm 21 and a similar stud 35 on the fixed bracket 23. The brake ring is mounted on the studs or journals 27a that secure the arms 26 of the member or supporting means 25 to the impelled member 7. Obviously when the arm 21 tightens the band 34, the members 7 and 25 remain motionless; and revolution of the gears 30 around the shaft 2 ceases. But the gears 30 can still be turned on their journals 29 by the pinion 31.

By reference to Figure 7, it can be seen that movement of the arm 21 over to the left into successive positions will give a progressively greater speed to the shaft 2 in the same direction as the shaft 1, but shifting the arm 21 to the right, swings the spout 20 out of the oil zone and locks the brake band 33. With the members 7 and 25 now stationary, the drive is not through the fluid coupling, but through the pinion 31, the gears 30 on the now motionless part 25 and the gear 8. Hence motion of the shaft 2 is now slower and reversed.

Thus the entire apparatus is easily manipulated through a single arm 21. It is simple and inexpensive and demands no skill, since there are no gears to be broken, in shifting.

Having described my invention, what I claim to be new, and desire to secure and protect by Letters Patent of the United States is:

1. Transmission mechanism comprising a drive shaft, a fixed pinion thereon, a hollow shaft to be driven containing one end of said drive shaft, an impeller carrying vanes fixed to the drive shaft, supporting means freely mounted on said driven shaft and carrying vanes to be operated by the first vanes, a planetary gear supported to revolve with said means and engaging the pinion, a gear engaging said planetary gear and keyed to the driven shaft, and an attachment for holding said means stationary, to cause the driven shaft to reverse.

2. Transmission mechanism comprising a hollow shaft to be driven, a drive shaft, a pinion fixed thereon, one end of the drive shaft telescoping within the hollow driven shaft, an impeller having vanes secured to the drive shaft, means carrying vanes to be driven by the first vanes, said means being freely mounted on the hollow driven shaft, a planetary gear supported to revolve with said means and meshing with the pinion, a gear keyed to the driven shaft and engaging said planetary gear, and encircling the latter and the pinion, and an attachment for holding said means stationary to cause the driven shaft to rotate in the reverse direction.

3. Transmission mechanism comprising coupling apparatus having a driven part, a container for fluid enveloping said apparatus, said container having a central opening, a nozzle in the container to supply fluid to said apparatus, an outside fixed support for the nozzle, an arm to adjust the nozzle, a pinion rotated by said driving part, a planetary gear revolved by said driven part and in mesh with the pinion, an element supporting said gear affixed to said driven part at spaced apart points eccentric to the axis of rotation thereof, an outer gear to be driven by the planetary gear, a brake ring secured to said last named part, and a band thereon controlled by said arm to put said gear into reverse rotation.

4. Transmission mechanism comprising coupling apparatus bearing a guard ring and having a driven part, a container for fluid enveloping said apparatus, said container having a central opening, a nozzle in the casing to deliver fluid within the guard ring, an outside fixed support on which the nozzle is mounted, an arm to adjust the nozzle, means including planetary gears to transmit motion from said apparatus, an element supporting said gears, studs connecting said element to said part at separated points eccentric to the axis of rotation thereof, and a brake ring carried said studs and controlled by said arm to modify the effect of said gears and reverse said motion.

5. Transmission mechanism comprising an impeller having vanes thereon, a member bearing vanes to be actuated thereby, a container for fluid enveloping said impeller and said member, and having a central opening, an outside fixed support, a nozzle mounted thereon to conduct fluid from said casing to said vanes, an arm to adjust said nozzle, planetary gearing, an element to support said gearing, studs connecting said element to said actuated member at separated points eccentric to the axis of rotation thereof a pinion rotated by the impeller engaging said planetary gearing, a gear meshing with the planetary gearing, a brake ring on said studs and a brake band thereon controlled by said arm to enable said means to be held motionless and said gear reversed.

6. Transmission mechanism comprising a drive shaft having an impeller and a pinion fixed thereon, said impeller carrying vanes, a hollow shaft to be driven, receiving one end of the drive shaft, a member having vanes to be actuated by said impeller, a container for fluid enveloping said impeller and said member, said container having a central opening, an outside fixed support, a nozzle on said support for conducting fluid to said vanes, an arm to adjust the nozzle, supporting means freely mounted on the hollow shaft, secured to said member, journals carried by said means, planetary gears on said journals, a housing keyed to the driven shaft having an internal gear engaged by said planetary gears, said pinion also meshing with said planetary gears, a brake ring secured to said means, and a band on said ring controlled by said arm to reverse the gear and driven shaft.

VEB HANSON.

REFERENCES CITED

The following references are of record in the file of this patent:

UNITED STATES PATENTS

| Number | Name | Date |
|---|---|---|
| 1,987,985 | Bauer et al. | Jan. 15, 1935 |
| 2,014,944 | Martyrer et al. | Sept. 17, 1935 |
| 2,024,842 | Bauer et al. | Dec. 17, 1935 |
| 2,133,029 | Kugel | Oct. 11, 1938 |
| 2,196,585 | Gette | Apr. 9, 1940 |
| 2,292,482 | Roche | Aug. 11, 1942 |
| 2,303,829 | Dodge | Dec. 1, 1942 |
| 2,314,253 | Stewart | Mar. 16, 1943 |
| 2,187,656 | Kiep | Jan. 16, 1940 |
| 2,187,667 | Sinclair | Jan. 16, 1940 |
| 2,264,340 | Sinclair | Dec. 2, 1941 |
| 1,203,265 | Radcliffe | Oct. 31, 1916 |
| 1,473,487 | McCarthy | Nov. 6, 1923 |
| 2,284,934 | Watson | June 2, 1942 |

FOREIGN PATENTS

| Number | Country | Date |
|---|---|---|
| 476,887 | British | Dec. 16, 1937 |